US007202969B2

United States Patent
Teraue

(10) Patent No.: US 7,202,969 B2
(45) Date of Patent: Apr. 10, 2007

(54) IMAGE DATA OUTPUT APPARATUS, AND IMAGE DATA OUTPUT PROGRAM STORAGE MEDIUM

(75) Inventor: Eiji Teraue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 809 days.

(21) Appl. No.: 10/024,016

(22) Filed: Dec. 21, 2001

(65) Prior Publication Data

US 2002/0101627 A1 Aug. 1, 2002

(30) Foreign Application Priority Data

Jan. 31, 2001 (JP) .............................. 2001-022842

(51) Int. Cl.
*G06K 15/00* (2006.01)
*G06F 15/00* (2006.01)

(52) U.S. Cl. ...................................... 358/1.8; 358/1.18

(58) Field of Classification Search ............... 358/1.18, 358/244, 296
See application file for complete search history.

(56) References Cited

U.S. PATENT DOCUMENTS

| 5,191,429 | A | * | 3/1993 | Rourke ...................... 358/296 |
| 5,475,475 | A | * | 12/1995 | Kohtani et al. ............... 399/79 |
| 5,768,488 | A | * | 6/1998 | Stone et al. ............... 358/1.18 |
| 6,515,760 | B1 | * | 2/2003 | Lourette et al. ........... 358/1.18 |
| 6,624,908 | B1 | * | 9/2003 | Petchenkine et al. ...... 358/1.15 |

* cited by examiner

*Primary Examiner*—Gabriel I. Garcia
(74) *Attorney, Agent, or Firm*—Sughrue Mion, PLLC

(57) ABSTRACT

Prior to outputting a sheet, the number of divisions, wherein a sheet of paper is subjected to an area division, is designated in accordance with an operation, and images of which number is the same as that of the divisions are disposed on the associated areas, respectively. In the editing, even if there is an image having a size extending over one area of the divisional areas, image data is edited in such a manner that the projected portion of the image is removed and the remaining portion is recorded.

4 Claims, 7 Drawing Sheets

IMAGE DATA OUTPUT APPARATUS, AND IMAGE DATA OUTPUT PROGRAM STORAGE MEDIUM

BACKGROUND OF THE INVENTION

1. Field of the Invention

The present invention relates to an image data output apparatus for outputting image data, and an image data output program storage medium storing an image data output program, when executed in a computer, which causes the computer to operate as the image data output apparatus.

2. Description of the Related Art

Hitherto, there is performed such a matter that image data is fed to an image processing apparatus, which is implemented using a personal computer and the like, so that an edition of images on the image data is performed or color correction and the like is performed, and image data after such edition and color correction is outputted toward an image output apparatus such as a color printer so that the image output apparatus outputs a desired image.

When it is intended that this image output apparatus is used to output a plurality of images on a sheet, an image processing apparatus side determines a position on the same size of area as the sheet in the order that a plurality of image data representative of the plurality of images is fed to the image processing apparatus, in such a manner that the respective images are not overlapped with one another taking into consideration a size of each of the images, a designated margin of the sheet and a designated interval between the adjacent images, and when new image data is fed, at the time point when an image represented by the new image data is too large to be accommodated in a space other than a space in which the images are already disposed, on the same size of area as the sheet, image data representative of the whole images already disposed is outputted.

However, according to the above-mentioned method, it is difficult to identify how many images are disposed on a sheet unless the images outputted from the image output apparatus are confirmed. Further, even if there is a case where before an image, in which a plurality of pieces of image is disposed on a sheet, is outputted, it is desired to determine the number of pieces of image to be disposed on a sheet, it is impossible to respond such a request.

Further, in case of the above-mentioned method, even if there is a case where of plurality of images, there exists an image of which a peripheral portion is simply a background element or a margin, and thus the peripheral portion is permitted to be omitted, a layout is performed in accordance with a size of an image including the peripheral portion. And, even if an image of which the peripheral portion is permitted to be omitted is concerned, in the event that such an image cannot be accommodated, on a sheet, in a space other than a space in which other images are already disposed, the image including the peripheral portion is outputted to a new sheet, because the peripheral portion exists although the peripheral portion is permitted to be omitted. Thus, the sheet will be wasted.

SUMMARY OF THE INVENTION

In view of the foregoing, it is an object of the present invention to provide an image data output apparatus in which when a plurality of images is outputted on a sheet, the number of images to be disposed is determined prior to outputting the sheet, and preventing the sheet is wasted, and an image data output program storage medium storing an image data output program, when executed in a computer, which causes the computer to operate as the image data output apparatus.

To achieve the above-mentioned object, the present invention provides an image data output apparatus for outputting a plurality of pieces of image data representative of a plurality of images of which a number is identical to a divisional number obtained when a sheet of paper is divided into a plurality of areas, through editing into image data in which the plurality of images are recorded on the plurality of areas respectively, said image data output apparatus comprises:

a division number designating section for designating number of divisions in accordance with an operation, wherein a sheet of paper is subjected to an area division;

a data editing section for editing image data of which number is same as the number of divisions designated by said division number designating section, said image data being representative of same number of images as the number of divisions designated by said division number designating section, to image data in which said same number of images is recorded on the same number of areas obtained when a sheet of paper is divided into the same number of areas; and a data output section for outputting image data after edited by said data editing section, wherein said data editing section edits the same number of image data, in the event that there is an image of which size extends over a one area when a sheet of paper is divided into said same number of areas in said same number of images represented by said same number of image data, in such a manner that a portion projected from said one area of the image of which size extends over said one area is removed and a remaining portion is recorded on said one area of the image of which size extends over said one area.

To achieve the above-mentioned object, the present invention provides an image data output program storage medium storing an image data output program which causes a computer to operate as an image data output apparatus, when the image data output program is executed in the computer, wherein said image data output program storage medium comprising:

a division number designating section in which an image data output program stored in the image data output program storage medium designates number of divisions in accordance with an operation, wherein a sheet of paper is subjected to an area division;

a data editing section for editing image data of which number is same as the number of divisions designated by said division number designating section, said image data being representative of same number of images as the number of divisions designated by said division number designating section, to image data in which said same number of images is recorded on the same number of areas obtained when a sheet of paper is divided into the same number of areas; and a data output section for outputting image data after edited by said data editing section, wherein said data editing section edits the same number of image data, in the event that there is an image of which size extends over a one area when a sheet of paper is divided into said same number of areas in said same number of images represented by said same number of image data, in such a manner that a portion projected from said one area of the image of which size extends over said one area is removed and a remaining portion is recorded on said one area of the image of which size extends over said one area.

According to the present invention, when a plurality of images are outputted on a sheet of paper, prior to outputting a sheet, the number of divisions, wherein a sheet of paper is subjected to an area division, is designated in accordance with an operation, and the same number of images as the number of divisions are disposed on the associated areas, respectively. Accordingly, the number of images to be disposed on a sheet of paper is determined prior to outputting a sheet.

In the editing, even if there is an image having a size extending over one area of the divisional areas, image data is edited in such a manner that the projected portion of the image is removed and the remaining portion is recorded. Accordingly, the same number of images as the number of divisions is surely recorded on a sheet, and thereby preventing the sheet from being wasted.

DETAILED DESCRIPTION OF PREFERRED EMBODIMENTS

Embodiments of the present invention will be described with reference to the accompanying drawings.

Figure 1:
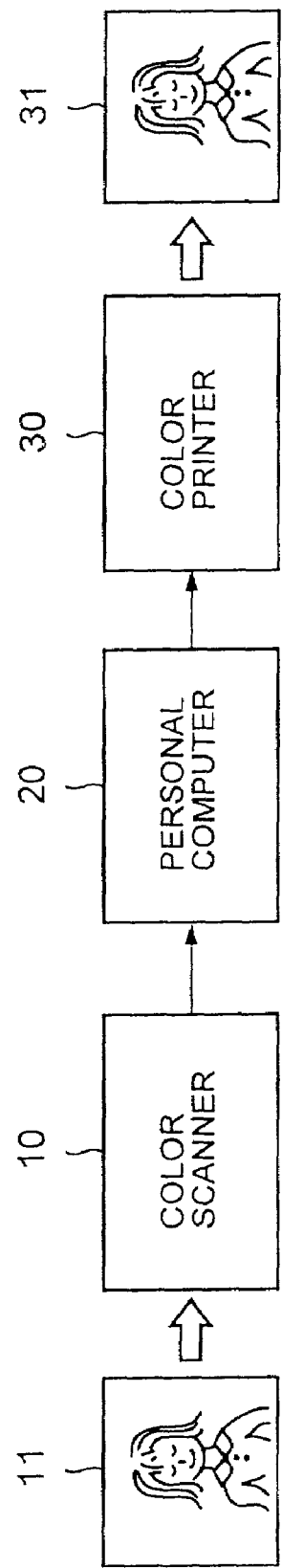
FIG. 1 is a schematic constitution view of an image input-image data editing-image output system to which an embodiment of the present invention is applied.

FIG. 1 is a schematic constitution view of an image input-image data editing-image output system to which an embodiment of the present invention is applied.

A color scanner 10 reads an original image 11 and creates image data for three colors consisting of cyan (C) magenta (M) and yellow (Y). The image data of CMY produced by the scanner 10 is fed to a personal computer 20. The personal computer 20 converts the image data obtained by the scanner 10 into image data for image output suitable for a color printer 30, which will be described later. The image data for image output is fed to the color printer 30. The color printer 30 performs a printing output in accordance with the input image data so that a print image 31 is formed.

In the system shown in FIG. 1, as an example of an image output apparatus for outputting an image based on image data, there is shown the color printer 30. It is noted, however, that the color printer 30 can be replaced by an electrophotographic type of color printer, an ink jet type of color printer, or such a type of printer that a printing paper is exposed with a modulated laser light and the exposed printing paper is developed. That is, a printing type or scheme is not important for the color printer 30.

An aspect as an embodiment of the present invention in the system shown in FIG. 1 resides in processing contents to be executed inside the personal computer 20. Hereinafter, there will be described the personal computer 20.

Figure 2:
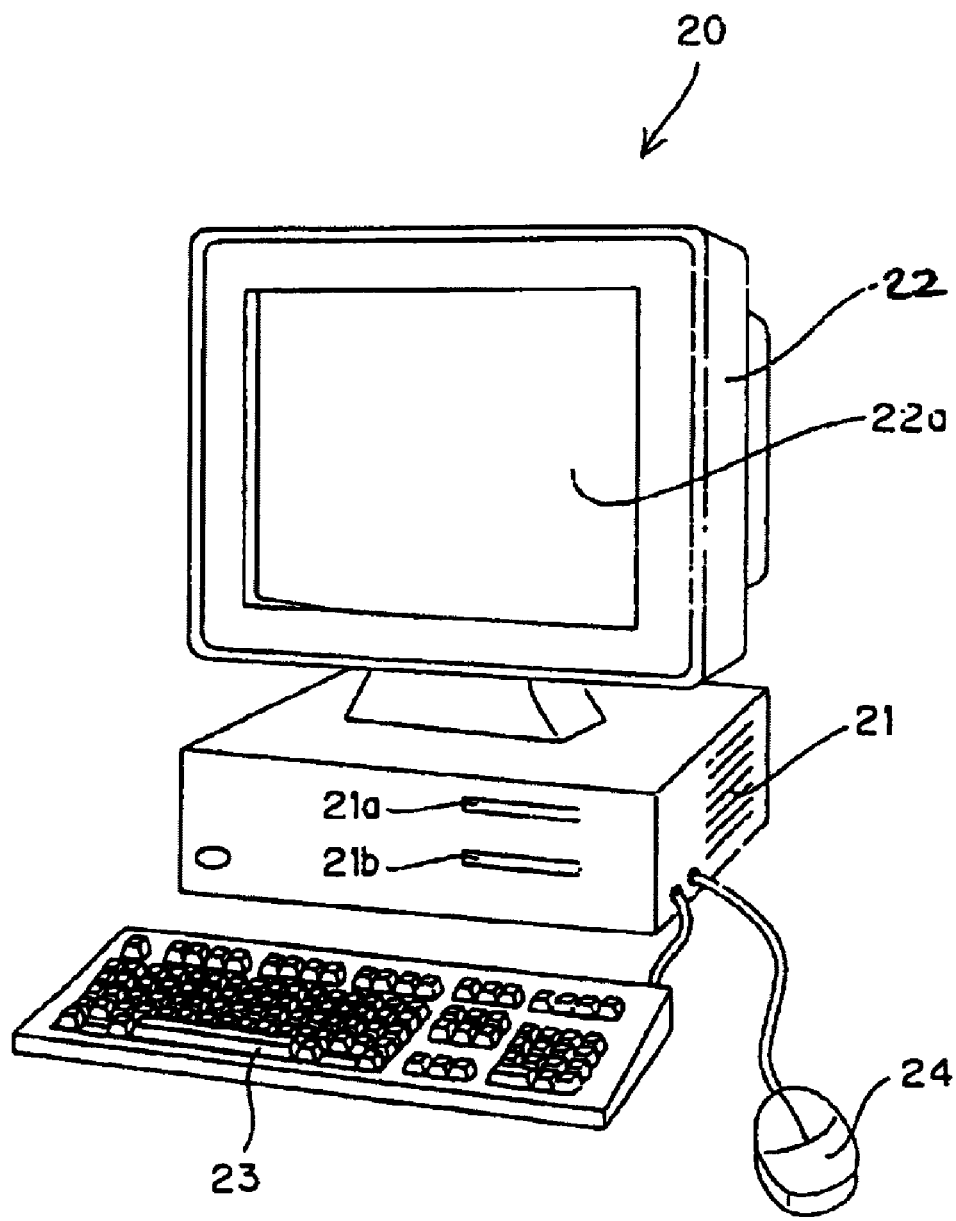
FIG. 2 is a perspective view of a personal computer shown in FIG. 1.
Figure 3:
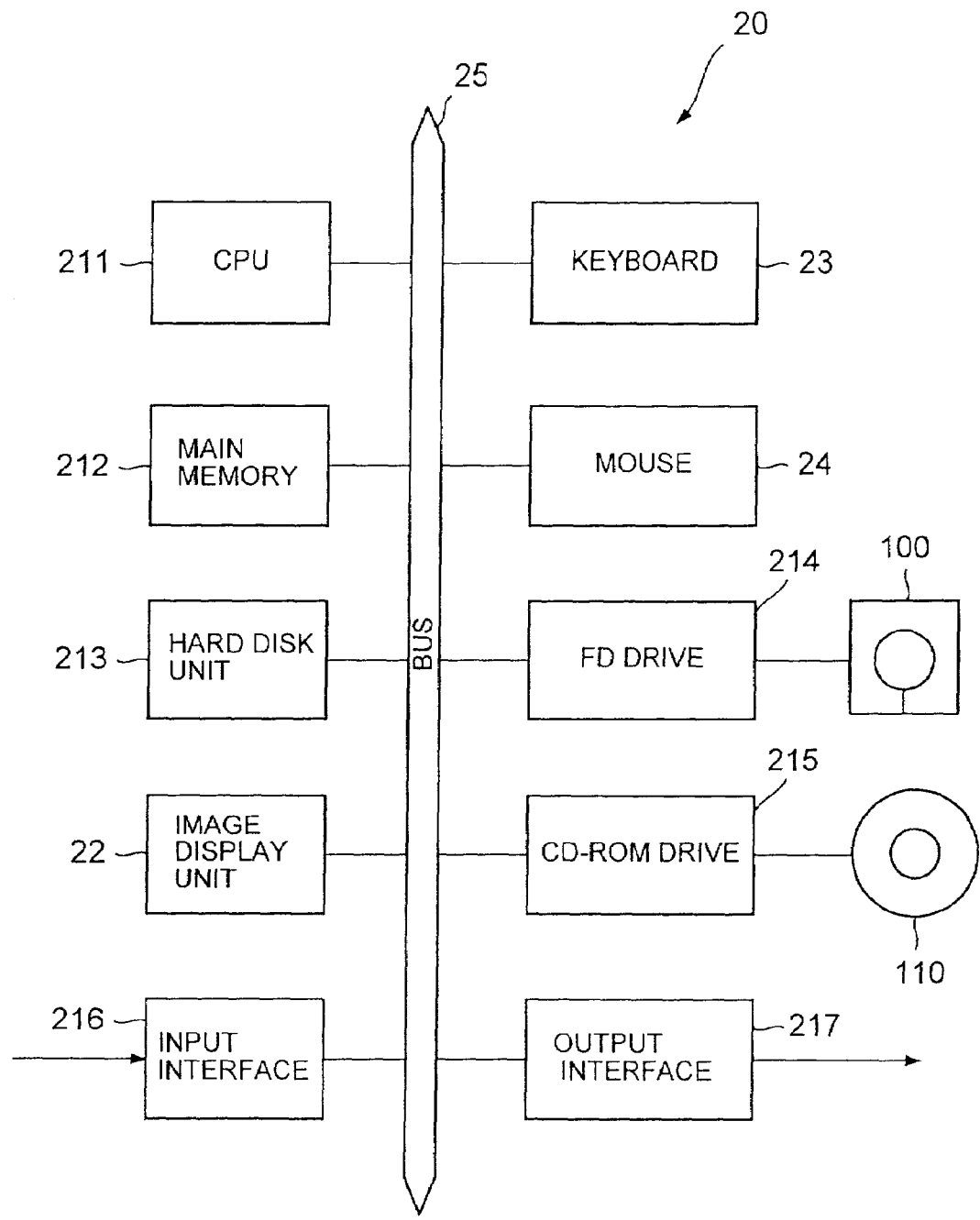
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the color scanner 10 (cf. FIG. 1), to receive image data from the color scanner 10, and an output interface 217 to transmit image data to the color printer 30. These various types of elements are connected via a bus 25 to the image display unit 22, the keyboard 23 and the mouse 24.

The CD-ROM 110 stores therein an image data output program for causing the personal computer 20 to operate as an image data output apparatus. The CD-ROM 110 is mounted on the CD-ROM drive 215 so that the image data output program, which is stored in the CD-ROM 110, is up-loaded on the personal computer 20 and is stored in the hard disk unit 213.

Figure 4:
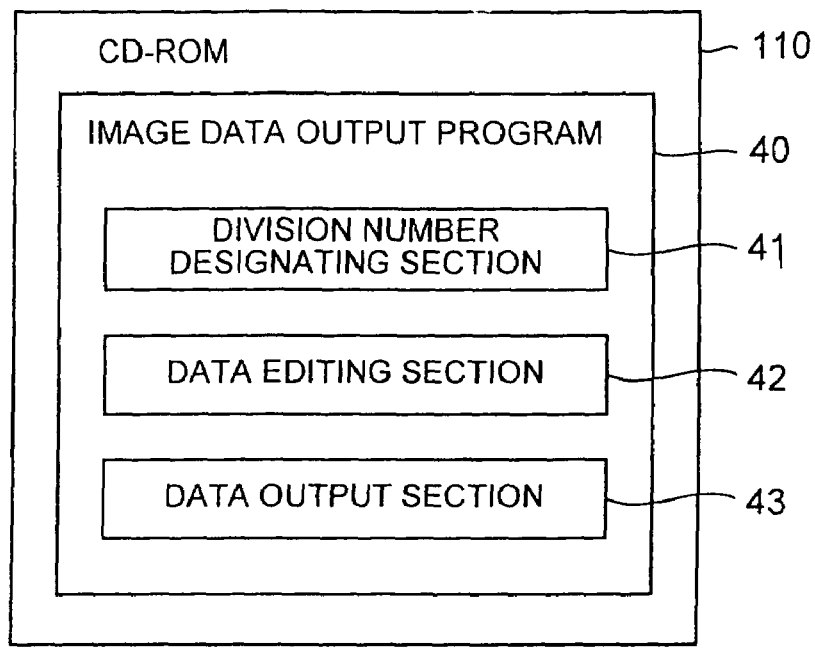
FIG. 4 is a view showing an embodiment of an image data output program storage medium according to the present invention.

FIG. 4 is a view showing an embodiment of an image data output program storage medium according to the present invention. The CD-ROM 110 shown in FIG. 3 is an example of the image data output program storage medium, and the image data output program 40 shown in FIG. 4 is stored in the CD-ROM 110.

An image data output program 40 comprises a division number designating section 41, a data editing section 42 and a data outputting section 43. Contents of the respective sections of the image data output program 40 will be described later.

Figure 5:
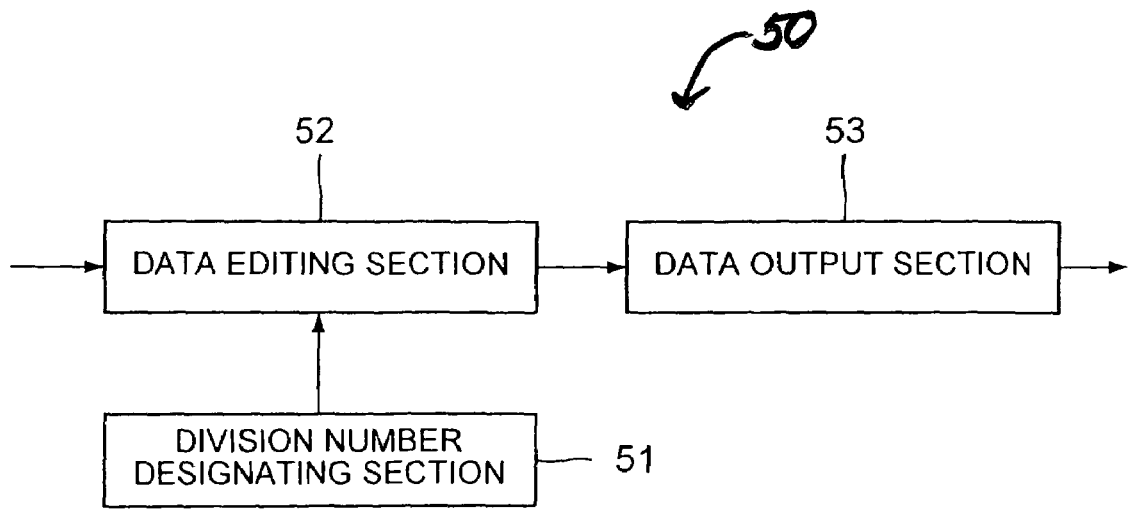
FIG. 5 is a functional block diagram of an embodiment of an image data output apparatus according to the present invention.

FIG. 5 is a functional block diagram of an embodiment of an image data output apparatus according to the present invention.

An image data output apparatus 50 shown in FIG. 5 is implemented when the image data output program 40 shown in FIG. 4 is loaded onto the personal computer 20 shown in FIGS. 1 to 3 and is executed by the personal computer 20.

The image data output apparatus 50 shown in FIG. 5 comprises a division number designating section 51, a data editing section 52 and a data outputting section 53. The division number designating section 51, the data editing section 52 and the data outputting section 53 comprise combinations of the division number designating section 41, the data editing section 42 and the data outputting section 43, and hardware and operation systems (OS) of the personal computer 20, which are necessary for implementing functions of their associated software components, respectively.

Hereinafter, there will be described a function of the present embodiment.

The division number designating section 51 designates the number of divisions wherein a sheet of paper is subjected to an area division in accordance an operation of the keyboard 23 or the mouse 24 of the personal computer 20 shown in FIG. 2 by an operator.

The data editing section 52 receives sequentially image data read through the color scanner 10 shown in FIG. 1 and image data created in the personal computer 20 shown in FIG. 1.

And the data editing section 52 edits image data of which the number of pieces is the same as the number of divisions designated by the division number designating section 51 so as to be image data representative of the whole images disposed throughout a sheet of paper when the respective images are disposed on the associated divisional areas on a sheet of paper.

Here, in the editing, even if there is an image having a size extending over one area of the divisional areas, image data is edited in such a manner that the projected portion of the image is removed and the remaining portion is recorded.

Further, according to the present embodiment, image data is edited in such a manner that the center of the respective image is disposed at the center of the associated divisional area.

Figure 6:
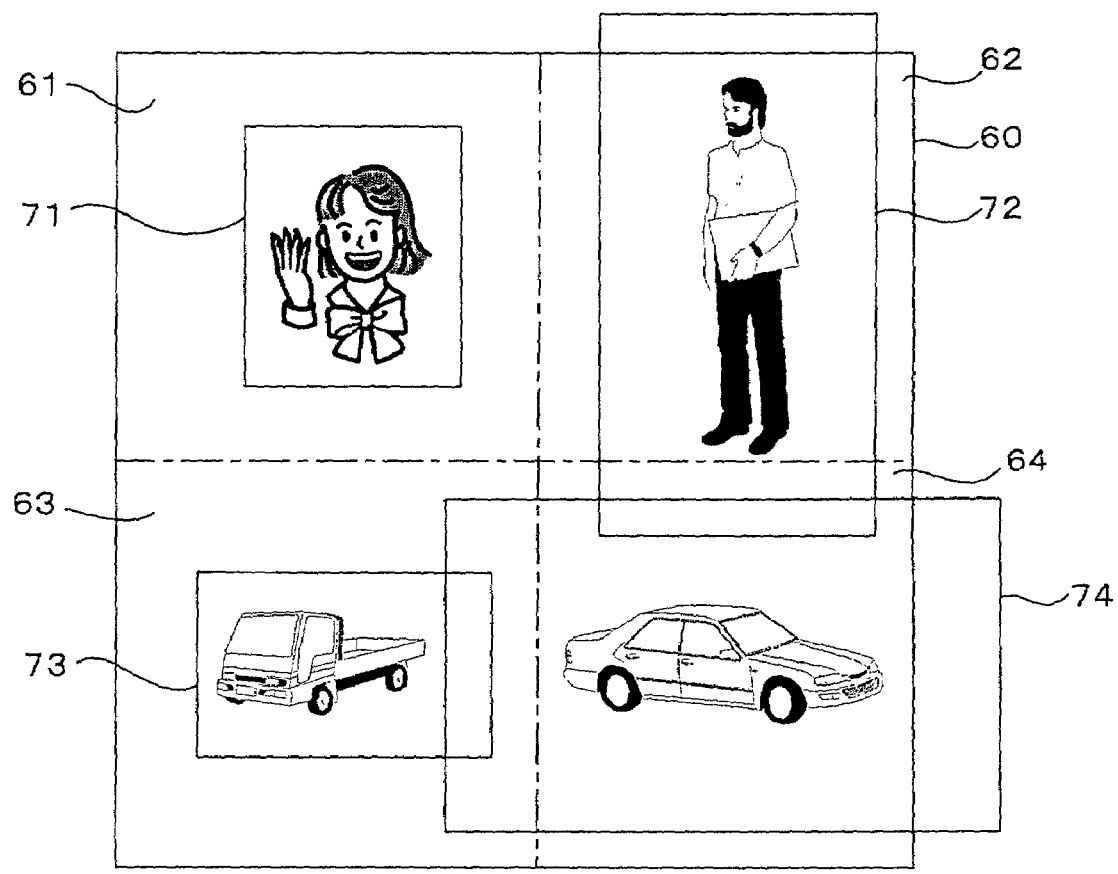
FIG. 6 is a typical illustration showing a state that four images represented by four pieces of image data before editing of image data are applied to areas when a sheet of paper is divided into four pieces of sheet.
Figure 7:
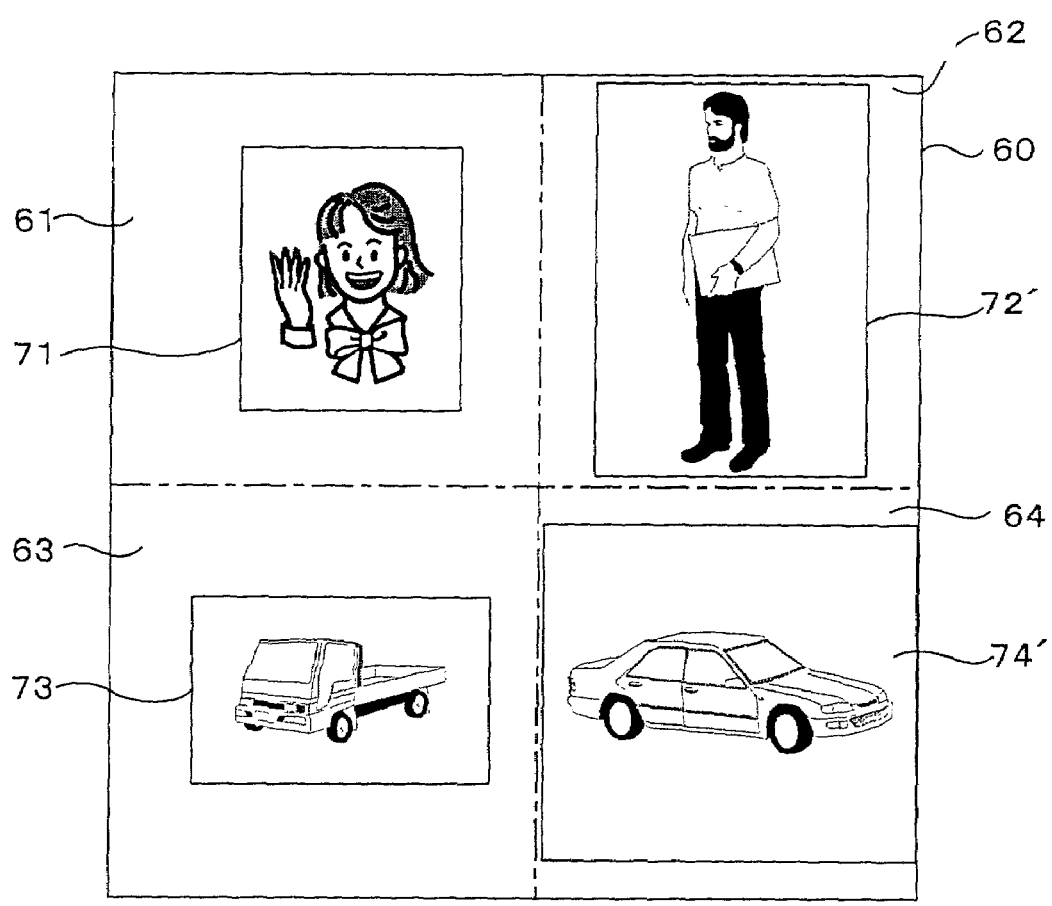
FIG. 7 is a typical illustration showing the whole images throughout a sheet of paper, which are represented by image data after editing.

FIG. 6 is a typical illustration showing a state that four images represented by four pieces of image data before editing of image data are applied to areas when a sheet of paper is divided into four pieces of sheet. FIG. 7 is a typical illustration showing the whole images throughout a sheet of paper, which are represented by image data after editing.

According to the embodiment shown in FIG. 6, images 71, 72, 73 and 74, which are represented by image data, are disposed on divisional areas 61, 62, 63 and 64, which are obtained when a sheet of paper 60 is divided into four pieces, respectively, in such a manner that the centers of the divisional areas 61, 62, 63 and 64 are coincident with the centers of the images 71, 72, 73 and 74, respectively. Of those four images 71, 72, 73 and 74, the images 71 and 73 disposed on the divisional areas 61 and 63 are disposed in their entirety inside the divisional areas 61 and 63. On the other hand, the image 72 disposed on one divisional area 62, of the remaining two divisional areas 62 and 64, projects from the divisional area 62 with respect to the upper and lower portions of the image. And the image 74 disposed on another divisional area 64 projects from the divisional area 64 with respect to the right and left portions of the image.

In this case, our pieces of image data representative of those four images are edited, as shown in FIG. 7, with respect to the images of which parts are projected, so as to be image data representative of the whole images including new images 72' and 74' in which the portions projected from the divisional areas 62 and 64 are removed.

The image data thus edited are outputted from the data output section 53 shown in FIG. 5.

The image data outputted from the data output section 53 are fed to the color printer 30 shown in FIG. 1, so that images disposed on the associated divisional areas are outputted to a paper.

Figure 8:
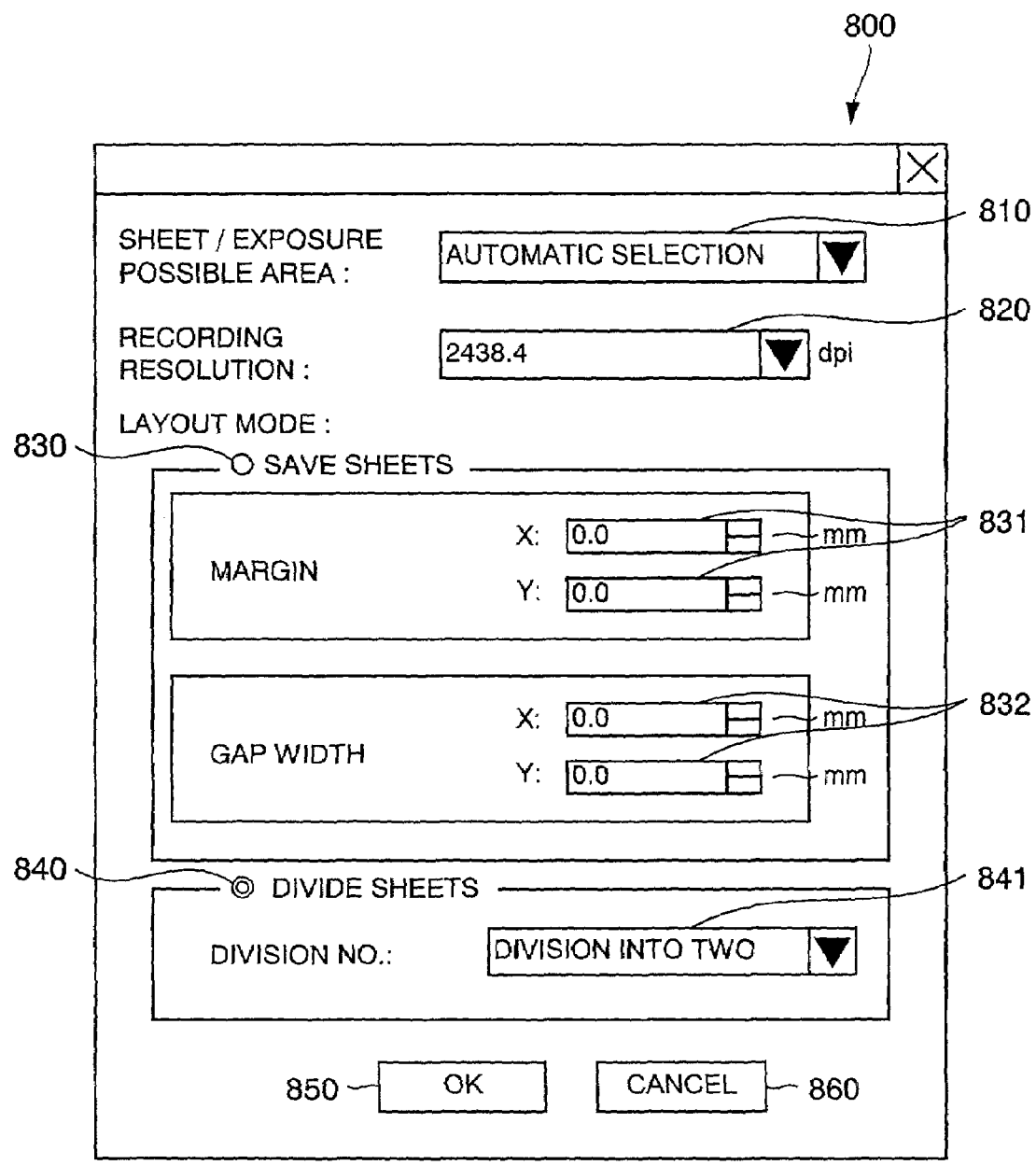
FIG. 8 is a view showing a job layout set up screen for designating the number of divisions.

FIG. 8 is a view showing a job layout set up screen for designating the number of divisions.

When a predetermined operation is performed through an operation of the keyboard 23 or the mouse 24 of the personal computer 20 shown in FIG. 2, a job layout set up screen 800 shown in FIG. 8 is displayed on the display screen 22a of the image display unit 22 of the personal computer 20.

The job layout set up screen 800 is provided with a selection column 810 for a sheet on which an image is be recorded, a selection column 820 for a resolution of the printed image 31 outputted from the color printer 30 shown in FIG. 1, a set up column 830 for selecting a layout mode in which images are recorded by the number permitted in recording on a sheet of paper as many as possible, designating columns 831 each for a margin size of the edge portion of the sheet in the event that the layout mode is selected, designating columns 832 each for an interval size between images in the event that the layout mode is selected, a set up column 840 for selecting another layout mode different from the layout mode in which images are recorded by the number permitted in recording on a sheet of paper as many as possible, in the another layout mode, the number of divisions, in which a sheet of paper is subjected to an area division, is designated so that images are recorded on the associated divided areas, respectively, and a selection column 841 for the number of divisions in the event that the another layout mode is selected. When those elements are set up through the mouse operation or utilizing ones already set up, and an OK button 850 is clicked, the data editing according to the selected layout mode is performed, and image data obtained by the editing is outputted. According to the example shown in FIG. 8, images are recorded on the associated areas, which are obtained when a sheet of paper is divided into two pieces, respectively.

With respect to the image editing method in selecting the layout mode in which images are recorded by the number permitted in recording on a sheet of paper as many as possible, it has been already explained in the column of "Description of the Related Art". Thus, the redundant explanation will be omitted.

A cancel button 860 is for closing the job layout set up screen 800 shown in FIG. 8.

As mentioned above, according to the present invention, when a plurality of images is outputted on a sheet, the number of images to be disposed is determined prior to outputting the sheet, and preventing the sheet is wasted.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data output apparatus for outputting a plurality of pieces of image data representative of a plurality of images of which a number is identical to a divisional number obtained when a sheet of paper is divided into a plurality of areas, through editing into image data in which the plurality of images are recorded on the plurality of areas respectively, said image data output apparatus comprises:

a division number designating section for designating number of divisions in accordance with an operation, wherein a sheet of paper is subjected to an area division;

a data editing section for editing image data of which number is same as the number of divisions designated by said division number designating section, said image data being representative of same number of images as the number of divisions designated by said division number designating section, to image data in which said same number of images is recorded on the same number of areas obtained when a sheet of paper is divided into the same number of areas; and a data output section for outputting image data after edited by said data editing section, wherein said data editing section edits the same number of image data, in the event that there is an image of which size extends over a one area when a sheet of paper is divided into said same number of areas in said same number of images represented by said same number of image data, in such a manner that a portion of image data projected from said one area of the image of which size extends over said one area is removed and a remaining portion of the image data is recorded on said one area of the image.

2. The apparatus of claim 1, wherein the data editing section maintains a size of a subject of the image on the one area after the portion projected is removed.

3. The apparatus of claim 2 wherein the data editing section removes the projected portion automatically.

4. An image data output program storage medium storing an image data output program which causes a computer to operate as an image data output apparatus, when the image data output program is executed in the computer, wherein said image data output program storage medium comprising:

a division number designating section in which an image data output program stored in the image data output program storage medium designates number of divisions in accordance with an operation, wherein a sheet of paper is subjected to an area division;

a data editing section for editing image data of which number is same as the number of divisions designated by said division number designating section, said image data being representative of same number of images as the number of divisions designated by said division number designating section, to image data in which said same number of images is recorded on the same number of areas obtained when a sheet of paper is divided into the same number of areas; and a data output section for outputting image data after edited by said data editing section, wherein said data editing section edits the same number of image data, in the event that there is an image of which size extends over a one area when a sheet of paper is divided into said same number of areas in said same number of images represented by said same number of image data, in such a manner that a portion of said image data projected from said one area of the image of which size extends over said one area is removed and a remaining portion of the image data is recorded on said one area of the image.

* * * * *